United States Patent [19]
Ohtomo et al.

[11] Patent Number: 6,101,068
[45] Date of Patent: Aug. 8, 2000

[54] MR COMPOSITE-TYPE THIN-FILM MAGNETIC HEAD HAVING AN UPPER POLE WITH A HIGH SATURATION MAGNETIC FLUX DENSITY AND AN INTERMEDIATE POLE WITH A HIGH RESISTIVITY

[75] Inventors: Shigekazu Ohtomo; Shuji Sudo; Yuji Ueda; Kuniaki Yoshimura; Hideji Takahashi, all of Mooka, Japan

[73] Assignee: Hitachi Metals, Ltd., Tokyo, Japan

[21] Appl. No.: 09/157,958

[22] Filed: Sep. 22, 1998

[30] Foreign Application Priority Data

Sep. 22, 1997 [JP] Japan ..................................... 9-257205
Oct. 17, 1997 [JP] Japan ..................................... 9-285216

[51] Int. Cl.⁷ ................................. G11B 5/21; G11B 5/39

[52] U.S. Cl. ........................................... 360/126; 360/317

[58] Field of Search .................................... 360/113, 126, 360/317

[56] References Cited

U.S. PATENT DOCUMENTS

| | | | |
|---|---|---|---|
| 5,371,643 | 12/1994 | Yuito et al. | 360/113 |
| 5,754,376 | 5/1998 | Kobayashi et al. | 360/113 |
| 5,938,941 | 8/1999 | Ishiwata et al. | 216/22 |
| 5,995,342 | 11/1999 | Cohen et al. | 360/126 |

FOREIGN PATENT DOCUMENTS

| | | |
|---|---|---|
| 2-126410 | 5/1990 | Japan . |
| 2-308408 | 12/1990 | Japan . |
| 4-232606 | 8/1992 | Japan . |
| 5-120630 | 5/1993 | Japan . |

*Primary Examiner*—Jefferson Evans

[57] ABSTRACT

A thin-film magnetic head includes an MR element serving as a reproducing element and a recording induction coil. The MR element is disposed between a lower magnetic pole and an intermediate magnetic pole. The recording induction coil is disposed between the intermediate magnetic pole and an upper magnetic pole. At least a portion of the upper magnetic pole in the vicinity of a recording gap is formed of a material having a high saturation magnetic flux density of 1.4 T or higher. The intermediate magnetic pole is formed of a material having a high resistivity of 80 $\mu\Omega$·cm or higher.

15 Claims, 9 Drawing Sheets

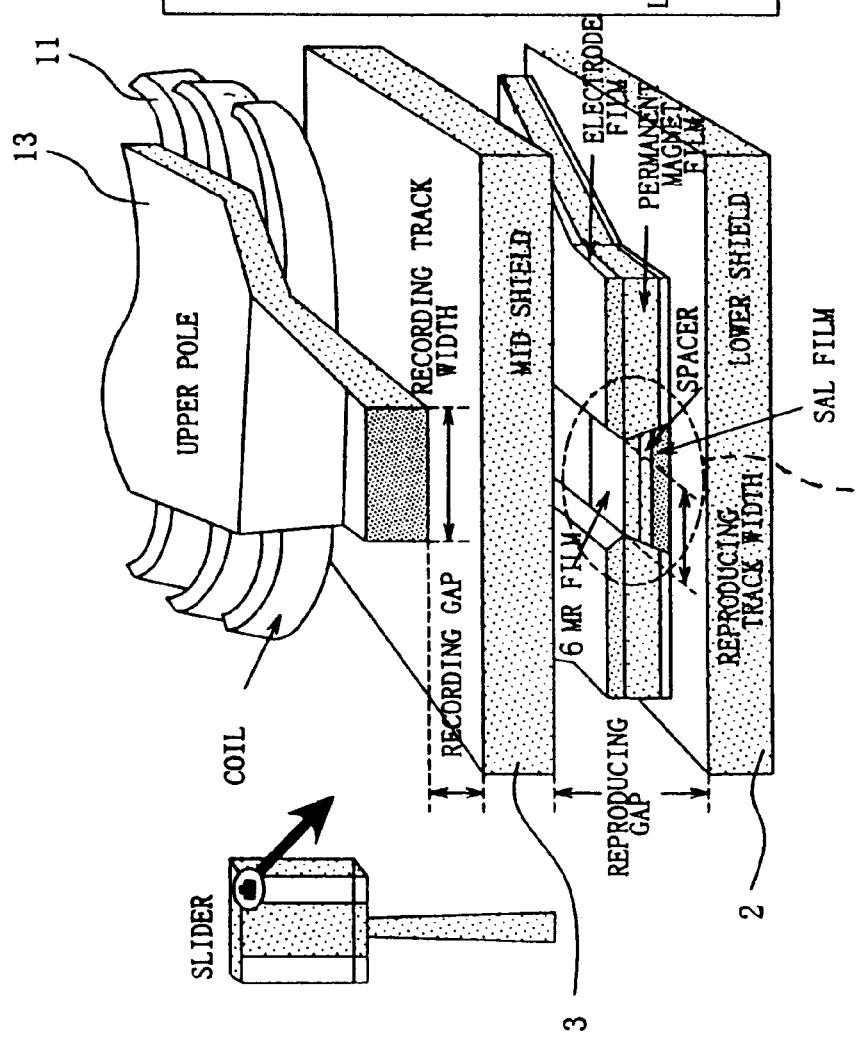

MR COMPOSITE-TYPE THIN-FILM MAGNETIC HEAD HAVING AN UPPER POLE WITH A HIGH SATURATION MAGNETIC FLUX DENSITY AND AN INTERMEDIATE POLE WITH A HIGH RESISTIVITY

BACKGROUND OF THE INVENTION

1. Field of the Invention

The present invention relates to a thin-film magnetic head, and more particularly to a thin-film magnetic head which exhibits a reduced nonlinear transition shift when used for high-density high-frequency digital recording, to thereby enable the high-density high-frequency digital recording.

2. Description of the Related Art

The recording density of magnetic recording devices has been drastically increased, and in the field of magnetic disk drives for computers, the recording density has increased at a rate of 60% per year. In order to further increase the recording density of magnetic recording devices, magnetic recording media must be improved. In addition, there must be developed a thin-film magnetic head that provides excellent recording/reproducing characteristics when applied to such improved media.

For example, an MR (magnetoresistance effect type) head—which provides a considerably higher output as compared with a conventional induction type head—has been developed and put into actual use for a reproducing head in order to achieve a recording density of 1 GB per square inch or more. Meanwhile, a conventional induction type thin-film magnetic head—which utilizes electromagnetic induction—has been used for a recording head. A recording/reproducing thin-film magnetic head in which the above-described reproducing head and recording head are integrally formed has been widely used.

FIGS. 10A–10C show the structure of an MR composite-type thin-film magnetic head presently used. FIG. 10A shows a top view of the MR composite-type thin-film magnetic head. FIG. 10B is a cross-sectional view taken along line A–A' in FIG. 10A, showing the vicinity of a floating surface. FIG. 10C is a cross-sectional view taken along line B–B' in FIG. 10A, showing the floating surface. In the MR composite-type thin-film magnetic head, a lower magnetic pole 2, an insulating layer 5, and an intermediate magnetic pole 3 are formed on a substrate 1, and a reproducing section 9 having an MR film 6 is formed between the lower magnetic pole 2 and the intermediate magnetic pole 3. A recording gap layer 10 is formed on the intermediate magnetic pole 3, and a coil 11 is formed on the recording gap layer 10. In order to insulate the coil 11, there is formed an insulating layer 12, on which an upper magnetic pole 13 is further formed. Further, a protective layer 17 is formed as an uppermost layer for protecting the above-described elements.

For the recording magnetic pole of the above-described thin-film magnetic head, there has conventionally been used a plated film (film formed through plating) of 83 Ni-17 Fe (wt. %) alloy. This material has excellent soft magnetic characteristics, and can be made into film through plating. Therefore, this material is suitable for a magnetic pole of a thin-film head having a narrow track width.

However, in the above-described thin-film magnetic head, there have arose the following problems as recording density and recording frequency have increased.

In magnetic disk drives for computers, with an increase in track recording density, characteristics in terms of overwriting (O/W) and nonlinear transition shift (hereinafter abbreviated as "NLTS") become unsatisfactory. Therefore, improving the O/W and NLTS characteristics is an important theme for coping with a future increase in recording density.

NLTS is a phenomenon which occurs in relation to recording of digital signals and in which a signal is recorded at a position shifted from the position where the signal is to be recorded. O/W is a phenomenon which occurs when a signal having a shorter wavelength is written in a superposed manner after recording of a signal having a longer wavelength and in which the signal having a longer wavelength remains unerased. O/W becomes a great problem when a recording medium having a high coercive force is used, and when the intensity and gradient of a recording magnetic field are insufficient for the recording medium. NLTS occurs when the high-frequency characteristics of a magnetic pole become insufficient during high-frequency high density recording and therefore delay occurs in variations in the recording magnetic field.

In order to increase the recording density of a recording medium, it is necessary to increase the coercive force of the recording medium to thereby prevent demagnetization due to a opposing magnetic field of a recording magnetization, and it is also necessary to decrease the size of a magnetization transition region, to thereby enable to an increased output to be obtained when recording is performed at high density. However, when a recording medium having a high coercive force is used, a strong recording magnetic field is required for sufficient magnetization of the recording medium in accordance with a signal. The above-described 83 Ni-17 Fe (wt. %) alloy having a saturation magnetic flux density of about 1 T causes a problem of magnetic pole saturation when it is used for a recording medium having a coercive force of 190 kA/m or higher, resulting in insufficient strength of the recording magnetic field. The insufficiency in the strength of recording magnetic field appears as deterioration of O/W characteristic, so that the level of O/W, which must be −30 dB or less, increases to −26 dB or greater.

Meanwhile, concurrently with the increase in recording density, recording frequency has increased. For example, there has been developed a magnetic disk drive that uses a disk having a diameter of 3.5 inches and is operated at 80 MHz or higher. When such a high frequency is used, the speed of changes in the magnetic flux of a magnetic pole cannot follow the speed of changes in record signals, so that delay is produced in changes of the recording magnetic field, resulting in deterioration in the above-described NLTS characteristic.

SUMMARY OF THE INVENTION

The present invention was accomplished in view of the foregoing problems involved in prior art techniques, and a main object of the present invention is to provide an MR composite-type thin-film magnetic head which has improved O/W and NLTS characteristics to thereby realize high-density high-frequency recording.

To achieve the above object, a thin-film magnetic head of the present invention comprises a reproducing element disposed between a lower magnetic pole and an intermediate magnetic pole, and a recording induction coil disposed between the intermediate magnetic pole and an upper magnetic pole, wherein at least a portion of the upper magnetic pole in the vicinity of a recording gap is formed of a magnetic material having a saturation magnetic flux density Bs of 1.4 T or higher, and the intermediate magnetic pole is formed of a magnetic material having a resistivity of 80 $\mu\Omega\cdot$cm or higher.

As described above, in the thin-film magnetic head of the present invention, at least a portion of the upper magnetic pole is formed of a magnetic material having a high saturation magnetic flux density Bs of 1.4 T or higher, and the intermediate magnetic pole is formed of a magnetic material having a resistivity of 80 $\mu\Omega$·cm or higher. Therefore, the thin-film magnetic head has excellent O/W and NLTS characteristics in-high density high-frequency recording.

That is, in the present invention, since at least a portion of the upper magnetic pole in the vicinity of the recoding gap is formed of a plated film having a high saturation magnetic flux density Bs of 1.4 T or higher, the thin-film magnetic head can generate a strong recording magnetic field that is sufficiently strong to be recorded on a medium having a high coercive force, so that the O/W characteristic can be improved.

In the present invention, a high-Bs plated film is preferably used as the material which is used for forming at least a portion of the upper magnetic pole and which has a high saturation magnetic flux density Bs of 1.4 T or higher. The reason why plated film is used is as follows. That is, when the thin-film magnetic head of the present invention is constructed in the form of an MR (magnetoresistance-effect-type) head in which an MR element is used as a reproducing element in order to obtain a high reproduction output, the shape of the floating surface of the upper magnetic pole 18 must be accurately formed to have a width corresponding to a track width of about 2 $\mu$m or less, because the upper magnetic pole 18 defines the track width Tw, as shown in FIG. 1B. When a plating method is employed in order to meet the above-described requirement, a resist is exposed and developed such that a rectangular depression having a width corresponding to a track width is formed; and plating is performed to form a film within the depression. Thus, there is accurately formed a rectangular upper magnetic pole whose thickness is greater than its width. When sputtering is employed in order to meet the above-described requirement, a sputtering film is formed first, and ion trimming, chemical etching, or a like process is performed while resist or the like is used as a mask, in order to obtain a desired track width. However, the thus-obtained film generally has a trapezoidal cross section in which the width at the lower portion of the film is greater than the width at the upper portion. Therefore, the upper magnetic pole cannot have a rectangular cross section as in the case of plated film.

A plated film of Ni—Fe alloy having a Ni content of not less than 40 wt. % but not greater than 50 wt. % is preferably used for the above-described high-Bs plated film. The Ni—Fe alloy plated film has a high saturation magnetic flux density of 1.5–1.7 T and a coercive force Hc of 120 A/m or less, and is therefore suitable for recording magnetic film. Further, since the Ni—Fe alloy plated film has a resistivity of about 55 $\mu\Omega$·cm, which is higher than the resistivity (about 22 $\mu\Omega$·cm) of 83 Ni-17 Fe alloy plated film, the Ni—Fe alloy plated film can improve the O/W and NLTS characteristics.

In the present invention, in order to improve high frequency characteristics and to reduce NLTS, a high-resistivity sputtered film having a resistivity of 80 $\mu\Omega$·cm or higher is preferably used as the high-resistivity material that is used for the intermediate magnetic pole and that has a resistivity of 80 $\mu\Omega$·cm or higher. More preferably, a high-resistivity sputtered film having a resistivity of 100 $\mu\Omega$·cm or higher is used. As shown in FIG. 7, the results of a computer simulation for calculating a rising speed of a recording magnetic filed indicates that the time required to reach 90% of the maximum recording magnetic field does not vary when the resistivity of the magnetic pole is equal to or greater than 100 $\mu\Omega$·cm, but when the resistivity of the magnetic pole is decreased to 50 $\mu\Omega$·cm the time becomes about twice that at 100 $\mu\Omega$·cm, and when the resistivity of the magnetic pole is decreased to 20 $\mu\Omega$·cm the time becomes about four times that at 100 $\mu\Omega$·cm. Meanwhile, when the resistivity of the magnetic pole is 80 $\mu\Omega$·cm, increase in the rising time of magnetic field is not greater than 30% that of maximum recording magnetic field. Therefore, when the resistivity of the intermediate magnetic pole is made 80 $\mu\Omega$·cm or greater, more preferably, 100 $\mu\Omega$·cm or greater, increase in the rising time of magnetic field is effectively prevented as compared with the case where conventional 83 Ni-17 Fe alloy plated film (22 $\mu\Omega$·cm) is used. Therefore, increase of NLTS at high frequency can conceivably be prevented.

In order to reduce NLTS at high frequency, there is preferably used a material having excellent soft magnetic properties, a high resistivity, and capability of preventing eddy-current loss. In general, a plated film having soft magnetic properties cannot have a high resistivity. By contrast, a sputtered film can have a high resistivity as well as soft magnetic properties. Further, a preferable result is obtained when the intermediate magnetic pole has a high saturation magnetic flux density. However, since the intermediate magnetic pole is wider than the upper magnetic pole, the intermediate magnetic pole is not required to have a saturation magnetic flux density as high as that of the upper magnetic pole. Further, when the thin-film magnetic head of the present invention is constructed in the form of an MR composite-type thin-film magnetic head, the upper magnetic pole must be precisely formed to have a narrow width, because as described above, the upper magnetic pole defines the track width. However, since the widths of the lower and intermediate magnetic poles are at least five times or more (in actuality, about 50 times) the width of the upper magnetic pole, the widths of the lower and intermediate magnetic poles are not required to be highly accurate. Accordingly, from the viewpoints of the above-described dimensional accuracy as well as reduction of NLTS, a high-resistivity sputtered film is preferably used for the high-resistivity material for the intermediate magnetic pole.

An example of the sputtered film having excellent soft magnetic characteristics, a high saturation magnetic flux density, and a high resistivity is amorphous Co-alloy film. Further, since the Co-alloy film is harder than a conventional Ni—Fe plated film, generation of a step on a floating surface during machining process is prevented to thereby improve flatness.

Specific examples of such a high-resistive sputtered film are amorphous alloy sputtered films formed of Co (82–94 at. %), Ta (3 at. % or more), and Zr (2 at. % or more). Among them, an amorphous alloy sputtered film whose Co content is as high as 94 at. % has a resistivity of 80 $\mu\Omega$·cm, which is relatively low as compared with those of other amorphous alloy sputtered films. However, the amorphous alloy sputtered film whose Co content is 94 at. % has a high saturation magnetic flux density of about 1.5 T, which is effective for obtaining an excellent O/W characteristic. Also, an amorphous alloy sputtered film whose Co content is as low as 82 at. % has a relatively low saturation magnetic flux density of about 0.8 T. However, the amorphous alloy sputtered film whose Co content is 82 at. % has a considerably high resistivity of about 150 $\mu\Omega$·cm, which is effective in reducing NLTS at high frequency.

The above-described thin-film magnetic head of the present invention may be constructed such that the widths of the lower and intermediate magnetic poles in the widthwise direction of a track are five times or more the track width, and the upper magnetic pole has a width substantially equal to the recording track width.

In the thin-film magnetic head of the present invention, since the reproducing element is disposed between the intermediate magnetic pole and the lower magnetic pole, the lower magnetic pole and the intermediate magnetic pole serve as magnetic shields for the reproducing element. This increases a reproduced output in the case of high recording density, thereby increasing resolution, which is a ratio of output in the case of high recording density to output in the case of low recording density. In order to secure the magnetic shield function of the intermediate magnetic pole and the lower magnetic pole, the intermediate and lower magnetic poles must have widths of at least twice the track width, preferably at least five times the track width. When the width of the intermediate magnetic pole is less than twice the track width, the shield function becomes insufficient, so that output in the case of high recording density decreases, resulting in deterioration in resolution due to a leakage magnetic field that enters the reproducing element in the widthwise direction of a track. Further, since the intermediate magnetic pole also serves as a recording magnetic pole, when the width of the intermediate magnetic pole is less than twice the track width, the magnetic flux through the tip end of the intermediate magnetic pole decreases, resulting in deterioration in recording characteristics. Accordingly, the width of the intermediate magnetic pole must be made at least twice the track width. Deterioration of recording characteristics can be sufficiently prevented when the width of the intermediate magnetic pole is made at least five times the track width.

Further, in the thin-film magnetic head of the present invention, a surface of the upper magnetic pole facing the intermediate magnetic pole is formed of two or more flat or curved surfaces in the vicinity of the floating surface which faces a recording medium; and an angle formed between a gap surface of the upper magnetic pole facing a gap between the upper and intermediate magnetic poles and a floating-surface-side tangential line of a flat or curved surface closest to the floating surface is made smaller than the corresponding angle of the remaining flat or curved surface.

The reason why the upper magnetic pole is constructed in the above-described manner in the vicinity of the floating surface is as follows. That is, in a conventional upper magnetic pole utilizing a plated film of 83 Ni-17 Fe alloy, as shown in FIG. 10B, a portion of the upper magnetic pole 13 in the vicinity of the floating surface is formed of a single continuous curved surface. In this structure, since magnetic flux is supplied directly to the gap portion even if the magnetic pole is formed of a material having a low Bs, deterioration in the O/W characteristic can be mitigated. In the shape shown in FIG. 10B, when the throat height d varies due to variations in machining accuracy, such a variation in the throat height dp appears as a variation in the film thickness h of the upper magnetic pole as viewed from the floating surface. The rate of variation in the film thickness h of the upper magnetic pole as viewed from the floating surface increases as the angle $\theta_3$ increases. Meanwhile, in the shape shown in FIG. 10B, the angle $\theta_3$ formed between the gap surface an d a floating-surface-side tangential line of a curved surface closest to the floating surface must be made greater than a predetermined value due to a space needed for disposition of a coil 11. As a result, when the throat height d varies due to variations in machining accuracy, a variation in the film thickness h of the upper magnetic pole as viewed from the floating surface reaches an unacceptable level.

In order to solve the above-described problem, in the present invention, a portion of the upper magnetic pole in the vicinity of the floating surface is formed of two or more curved surfaces; and an angle $\theta_1$ formed between the gap surface and a floating-surface-side tangential line of a curved surface closest to the floating surface is made smaller than the corresponding angle $\theta_2$ or $\theta_2'$ of the remaining curved surface. This structure decreases the variation in the film thickness h of the upper magnetic pole as viewed from the floating surface, which variation would otherwise be produced due to machining variations in the throat height d. Therefore, variations in the recording characteristics can be decreased. Needless to say, the upper magnetic pole may be formed through use of flat surfaces instead of curved surfaces. When the above-described structure is employed, the possibility of occurrence of leakage of magnetic flux between the curved surface of the upper magnetic pole near the floating surface and the lower magnetic pole increases, resulting in possible deterioration in the recording characteristics. However, this deterioration of the recording characteristics can be mitigated when the saturation magnetic flux density is set to be equal to or greater than 1.4 T.

When the upper magnetic pole is formed of two or more flat surfaces or curved surfaces, a flat or curved surface closest to the floating surface is formed such that the angle formed between the gap surface and a floating-surface-side tangential line of the flat or curved surface becomes not less than 20° but not greater than 40°. When the angle $\theta_1$ is less than 20°, an amount of leaked magnet flux increases, resulting in deterioration in recording characteristics. When the angle $\theta_1$ is greater than 40°, there is reduced the effect in decreasing the variation in the film thickness h of the upper magnetic pole as viewed from the floating surface, which variation would otherwise be produced due to machining variations in the throat height.

FIG. 8 shows the relationship between the angle $\theta_1$, and the calculated value of the recording magnetic field strength and a variation $\Delta h$ of the film thickness of the upper magnetic pole at the floating surface caused by a variation of 0.5 $\mu$m in the throat height d. When the angle $\theta_1$ is less than 20°, the recording magnetic field strength becomes about 380 kA/m or less, with a possible result that signals cannot be properly recorded on a recording medium having a coercive force of 190 kA/m or greater, which is used for high-density recording. It has been said that for proper recording of signals, the strength of a recording magnetic field must be at least twice the coercive force of a recording medium. When the angle $\theta_1$ is set to greater than 40°, the film thickness of the upper magnetic pole at the floating surface varies by 0.4 $\mu$m or more for a variation of 0.5 $\mu$m in the throat height d, which is a typical machining error. This variation in the film thickness of the upper magnetic pole corresponds to 10% or more of a typical thickness (3.5 $\mu$m) of the upper magnetic pole. In such a case, the variation of the recording characteristics increases. Accordingly, the angle $\theta_1$ is preferably set to be not less than 20° but not greater than 40°.

When the upper magnetic pole is formed of two or more flat surfaces or curved surfaces, a flat or curved surface other than the flat or curved surface closest to the floating surface is formed such that the angle $\theta_2$ or $\theta_2'$ formed between the gap surface and a floating-surface side tangential line of the flat or curved surface falls within a range of 50–80°. When the angle $\theta_2$ or $\theta_2'$ is set to less than 50°, as shown in FIG. 1A, the distance L between the floating surface and a coil nearest to the floating surface increases, resulting in a decrease in recording efficiency. When the angle $\theta_2$ or $\theta_2'$ is set to greater than 80°, a large angular difference is produced between the curved or flat surface nearest to the floating surface and the curved or flat surface adjacent thereto, so that a defect may be generated in the plated film at the boundary between the two surfaces, resulting in deterioration in recording characteristics.

According to another aspect of the present invention, the upper magnetic pole is formed of two or more layered magnetic films; and the saturation magnetic flux density Bs of the magnetic layer closer to the gap surface is set to 1.4 T or higher.

This enables employment of a magnetic film having a saturation magnetic flux density Bs of 1.4 T or higher for the magnetic layer closer to the gap surface, which greatly affects the recording characteristics, and also enables employment of a film having excellent soft magnetic characteristics, such as 83 Ni-17 Fe (wt. %) film, for the remaining portion. Thus, there can be obtained a magnetic head in which the recording magnetic field has an increased strength and quickly increases in response to a recording signal.

The above-described feature will be described in more detail. The high-Bs film used for forming at least a part of the upper magnetic pole of the thin-film magnetic head of the present invention is inferior to plated film of 83 Ni-17 Fe (wt. %) alloy in terms of soft magnetic characteristics. For example, Hc of the above described plated film of 45 Ni-55 Fe (wt. %) alloy is greater than Hc (24 A/m) of the plated film of 83 Ni-17 Fe (wt. %) alloy. Further, the plated film of 45Ni-55 Fe (wt. %) alloy has a disadvantage of a large magnetostrictive constant. In order to solve these drawbacks, the magnetic film whose saturation magnetic flux density is 1.4 T or greater and which is therefore inferior in terms of soft magnetic characteristics and has a large magnetostrictive constant is used only for a limited portion, and a film having excellent soft magnetic characteristics is used for the remaining portion. Thus, it becomes possible to obtain a magnetic head in which the recording magnetic field has an increased strength and quickly increases in response to a recording current.

In the above-described structure, the lower layer closer to the gap surface formed of a high-BS plated film preferably has a film thickness of 0.3–1.5 µm. When the thickness of the lower layer is less than 0.3 µm, the strength of a recording magnetic field does not increase sufficiently, so that the level of O/W does not become below −30 dB, which is a target value. When the thickness of the lower layer exceeds 1.5 µm, recording efficiency decreases, and the rising of the recording magnetic field response to the recording current becomes slow, so that the NLTS characteristic may deteriorate.

In the present invention, when the upper magnetic pole is formed through use of a plating method, a seed film through which plating current flows is formed to a thickness of about 0.1 µm. This seed film is desirably formed of a high-Bs film whose saturation magnetic flux density is 1.4 or higher, such as a sputtered film of 45 Ni-55 Fe (wt. %) alloy. However, the effect of the present invention is maintained even when a sputtered film of conventional 83 Ni-17 Fe (wt. %) alloy is used as a seed film, because the thickness of the seed film is small.

In the present invention, the upper magnetic pole is formed such that the upper magnetic pole has a film thickness of 2.5–5 µm at the center thereof. In the case where the entire upper magnetic pole is formed of a high-Bs plated film having a saturation magnetic flux density of 1.4 or greater, the thickness of the upper magnetic pole is preferably determined to be not less than 2.5 µm but not greater than 4 µm. When the film thickness of the upper magnetic pole is set to less than 2.5 µm, the O/W characteristic deteriorates. When the film thickness of the upper magnetic pole is set to greater than 4 µm, the NLTS characteristic deteriorates. The reason why the O/W characteristic deteriorates when the film thickness of the upper magnetic pole is less than 2.5 µm is that the amount of magnetic flux passing through the upper magnetic pole decreases, resulting in a decrease in the strength of recording magnetic field. The reason why the NLTS characteristic deteriorates when the film thickness of the upper magnetic pole is greater than 4 µm is not clear but is considered that the speed of change of magnetization decreases with an increase in the thickness of the magnetic film.

Further, in the case where the upper magnetic pole is formed of two or more magnetic layers and the magnetic layer closer to the gap is formed of a high-Bs plated film, the overall thickness of the upper magnetic pole is more preferably not less than 3.0 µm but not greater than 5.0 µm. In this case as well, the O/W characteristic deteriorates when the film thickness is made less than 3.0 µm, and the NLTS characteristic deteriorates when the film thickness is made greater than 5.0 µm.

Moreover, in the present invention, the size of the recording gap is set to be not less than 0.25 µm but not greater than 0.45 µm. When the size of the recording gap is less than 0.25 µm, the O/W and NLTS characteristics deteriorate. The reason why the O/W and NLTS characteristics deteriorate when the size of the recording gap is less than 0.25 µm is conceivably a reduction in the strength of recording magnetic field. When the size of the recording gap exceeds 0.45 µm, the NLTS characteristic deteriorates. The reason for deterioration in the NLTS characteristic is a reduction in rising speed of the magnetic field.

BRIEF DESCRIPTION OF THE DRAWINGS

FIG. 9 is a perspective view of an MR composite-type thin-film magnetic head;

DESCRIPTION OF THE PREFERRED EMBODIMENTS

Embodiments of the present invention will now be described with reference to the drawings.

Figure 1A:
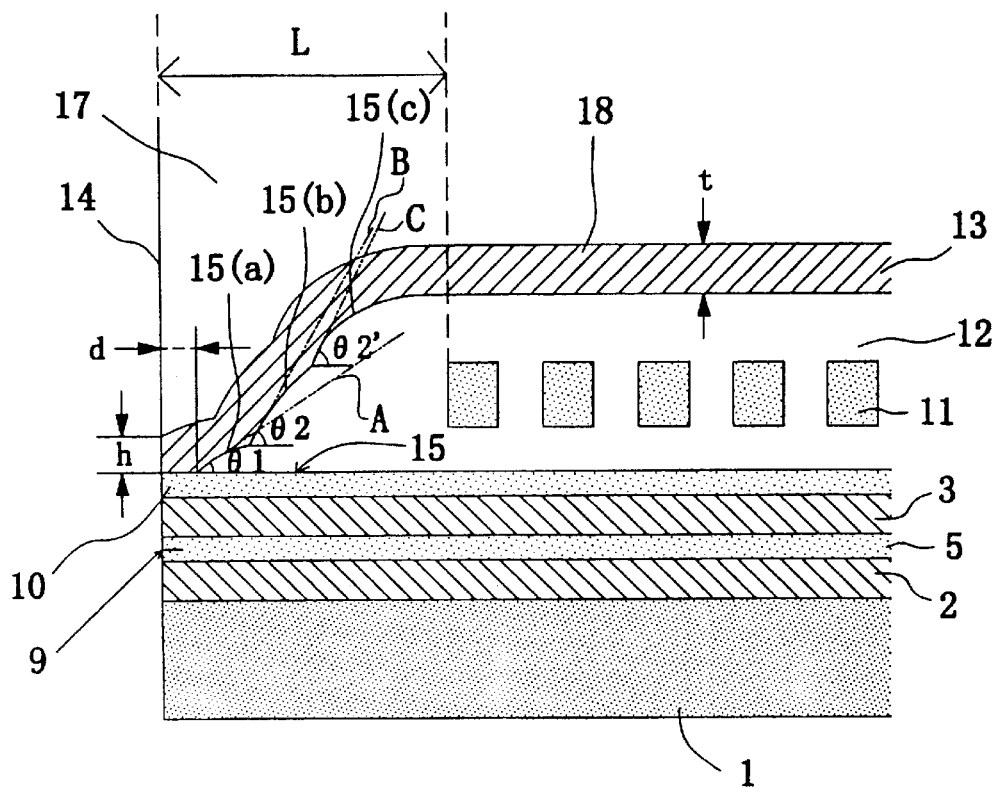
FIG. 1A is a cross-sectional view of an MR composite-type thin-film magnetic head according to a first embodiment of the present invention.
Figure 1B:
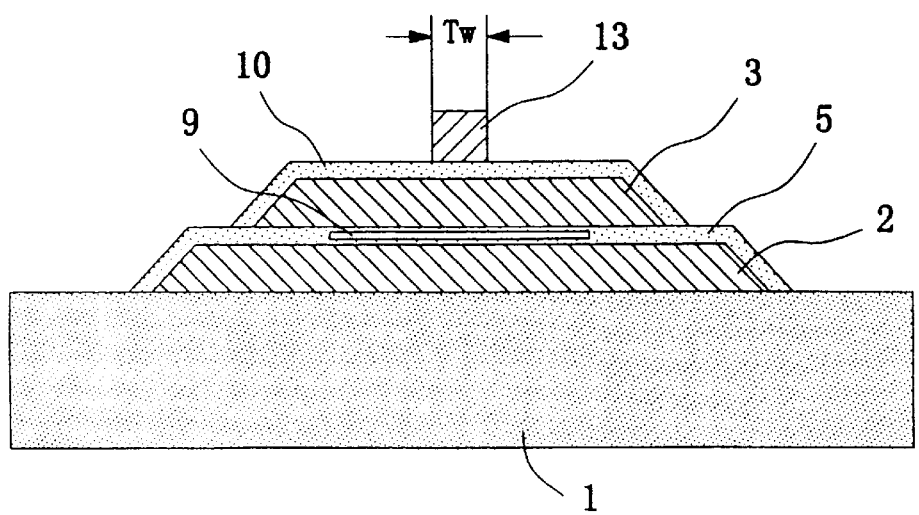
FIG. 1B is a cross-sectional view of the thin-film magnetic head of FIG. 1A, as viewed from the floating surface side.

First Embodiment:

First, a description will be given of a thin-film magnetic head according to a first aspect of the present invention which is constructed in the form of an MR composite-type thin-film magnetic head, as shown in FIGS. 1A and 1B.

Figure 10A:
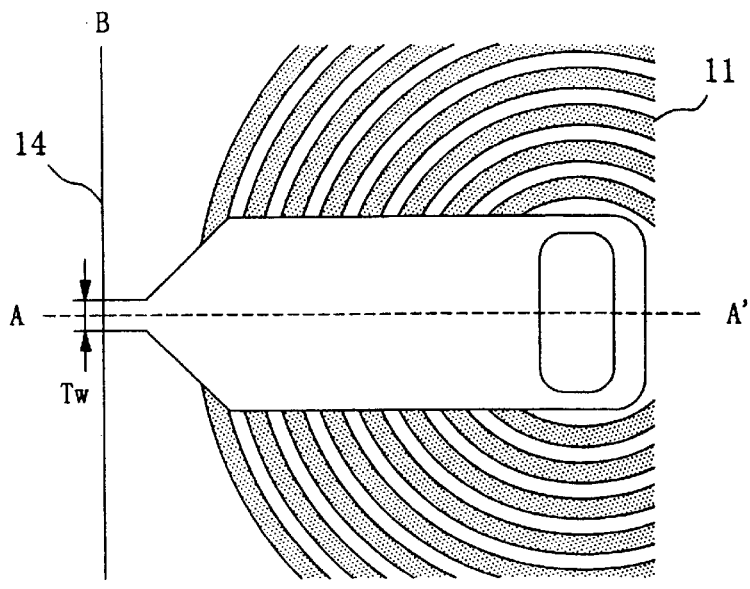
FIG. 10A is a plan view of a conventional MR composite-type thin-film magnetic head.

FIG. 1A corresponds to the cross-sectional view taken along line A–A' in FIG. 10A, which shows a plan view of a conventional MR composite-type thin-film magnetic head, while FIG. 1B corresponds to the cross-sectional view taken along line B–B' in FIG. 10A.

As shown in FIGS. 1A and 1B, a lower magnetic pole 2 is provided on a substrate 1, which is formed through use of $Al_2O_3$—TiC. As shown in FIG. 1B, edge portions of the magnetic film of the lower magnetic pole 2 are formed to slant with respect to the substrate 1. The inclination angle between either end surface of the magnetic film and the substrate 1 is set within the range of about 20–45°. An intermediate magnetic pole 3 is provided above the lower magnetic pole 2. Formed between the lower magnetic pole 2 and the intermediate magnetic pole 3 is a reproducing gap, within which is formed a reproducing section 9 mainly composed of an insulating layer 5, an MR film 6, electrodes, and a bias film. On the intermediate magnetic pole 3 are formed an insulating layer 10 forming a recording gap, a coil 11, and an insulating layer 12 for the coil 11. Further, an upper magnetic pole 13 is, provided on the insulating material 12 or on the intermediate magnetic pole 3.

As shown in the cross-sectional,views of FIGS. 1A and 1B, in the MR composite-type thin-film magnetic head of the present embodiment, the intermediate magnetic pole 3 is formed of a high-resistivity sputtered film, while the upper magnetic pole 13 is formed of a high-Bs plated film having a saturation magnetic flux density of 1.4 T or higher. A specific example of the high-resistivity sputtered film is a sputtered film of $Co_XTa_YZr_Z$ (X+Y+Z=100 at. %, X: 82–94 at. %, Y≧3 at. %, Z≧2 at. %) amorphous alloy. A specific example of the high-Bs plated film is a plated film of Ni—Fe alloy which has a composition equal to or varied from that of 45 Ni-55 Fe (wt. %) alloy and whose Ni content falls within a range of 40–50 wt. %. Like the intermediate magnetic pole 3, the lower magnetic pole 2 is formed from a high-resistivity sputtered film; more specifically, a sputtered film of CoTaZr amorphous alloy.

As shown in FIG. 1A, in the present embodiment, a surface of the upper magnetic pole 13 on the side of a gap surface 15 is formed of a plurality of curved surfaces 15(a), 15(b), and 15(c), and an angle $\theta_1$ formed between the gap surface 15 and a floating-surface-side tangential line A of the curved surface 15(a) closest to the floating surface 14 is made smaller than both the angle $\theta_2$ between the gap surface 15 and a floating-surface-side tangential line B of the curved surface 15(b) and the angle $\theta_2'$ between the gap surface 15 and a floating-surface-side tangential line C of the curved surface 15(c), wherein both the curved surfaces 15(b) and 15(c) are distant from the floating surface 14.

In the MR composite-type thin-film magnetic head according to the present embodiment having the above-described structure, a recording current is applied to the coil 11 in order to induce recording magnetic flux in the upper magnetic pole 13 and the intermediate magnetic pole 3, so that a signal is recorded on a recording medium disposed in the vicinity of the floating surface, by the action of a magnetic field leaked from the upper magnetic pole 13 and the intermediate magnetic pole 3 in the vicinity of the recording gap 10. During a reproducing operation, a magnetic field generated from the signal recorded in the form of magnetization on the recording medium is detected by use of the MR reproducing section 9.

Next, a description will be given of a method for manufacturing an MR composite-type thin-film magnetic head according to the first embodiment of the present invention.

Figure 2:
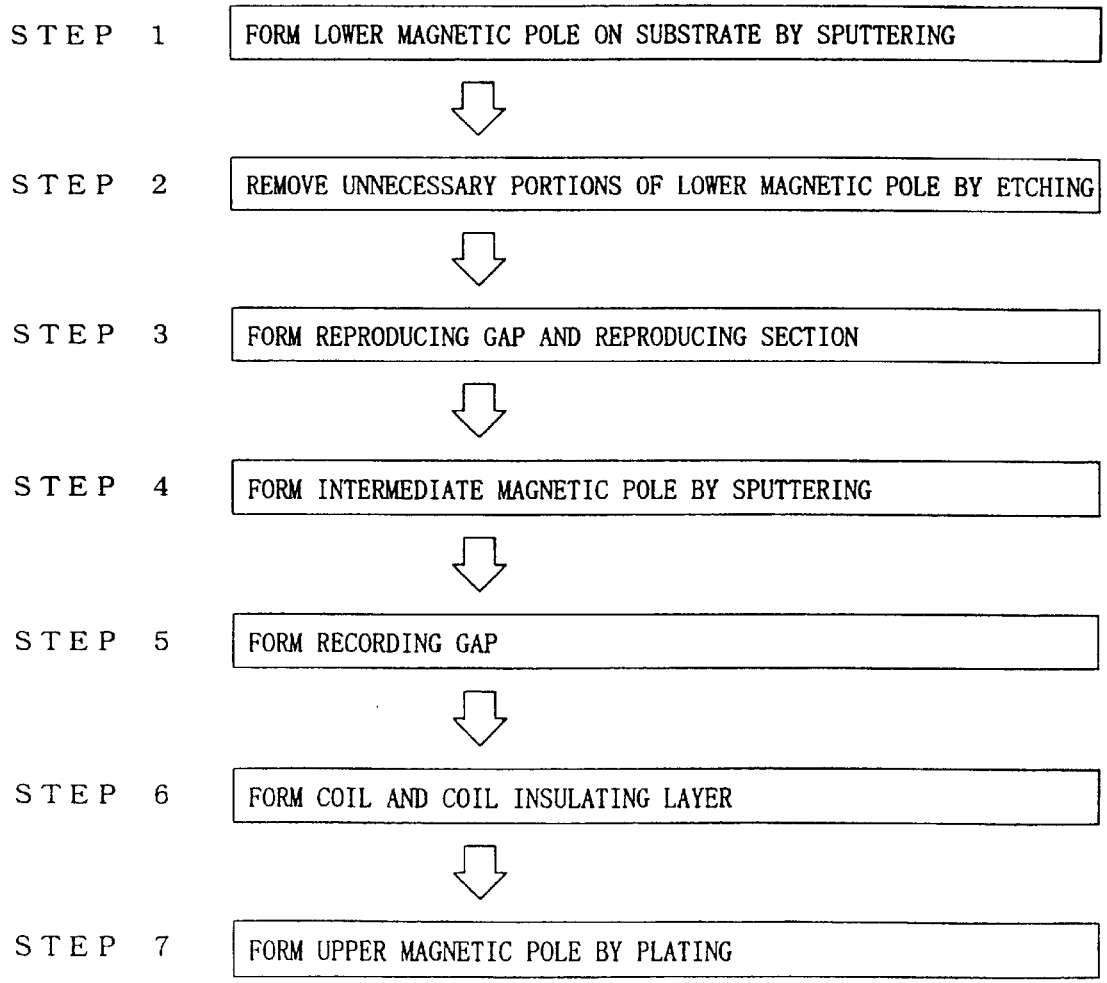
FIG. 2 is a process chart for manufacturing the thin-film magnetic head of FIG. 1A.
Figure 3:
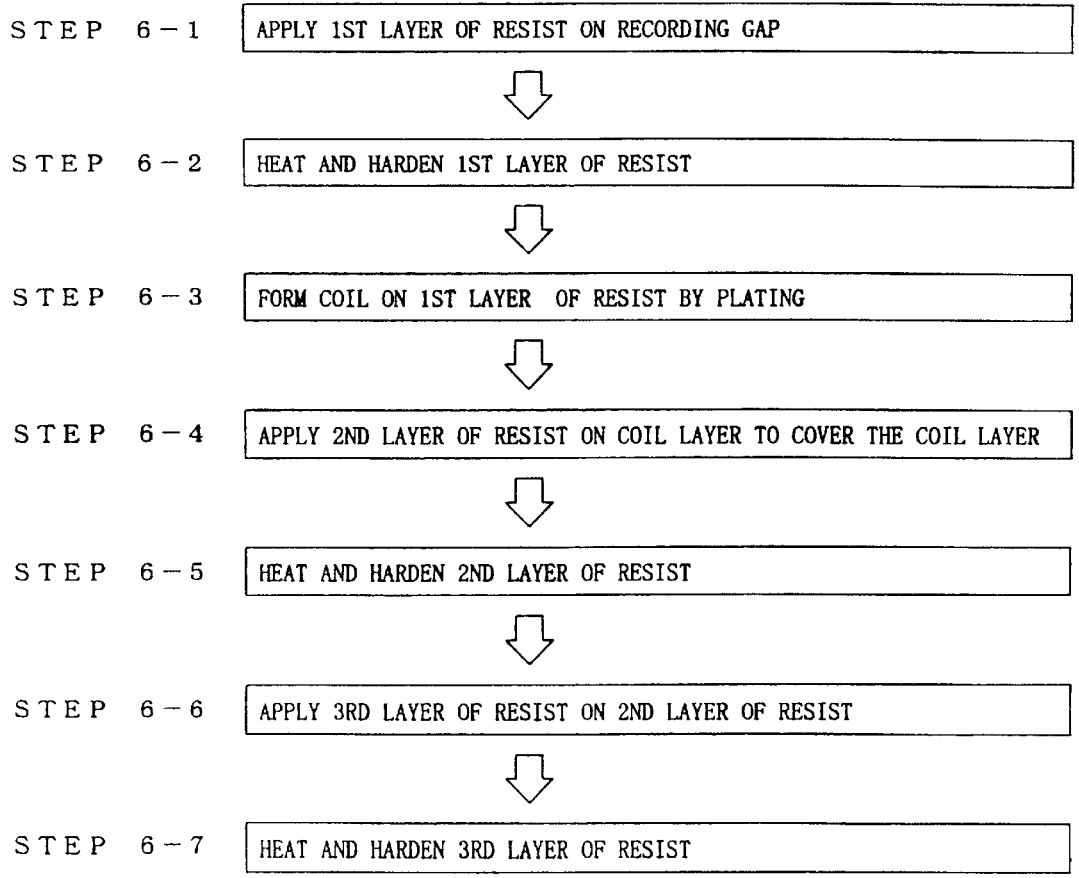
FIG. 3 is a process chart showing in more detail a part of the process chart of FIG. 2.

FIGS. 2 and 3 show a manufacturing process for the MR composite-type thin-film magnetic head according to the first embodiment.

Step 1:

First, the substrate 1 shown in FIGS. 1A and 1B is formed through use of $Al_2O_3$—TiC. Subsequently, a sputtered film of $Co_XTa_YZr_Z$ (X+Y+Z=100 at. %, X: 82–94 at. %, Y≧3 at. %, Z≧2 at. %) amorphous alloy is formed as the lower magnetic pole 2. A well-known magnetron sputtering apparatus may be used for this step.

Step 2:

Next, portions of the lower magnetic pole 2 to be left are protected through application of resist, and then unnecessary portions are removed through chemical etching. An example of etching solution used for the chemical etching is a mixture of nitric acid, cobalt sulfate, and hydrofluoric acid. Through such chemical etching, as shown in FIG. 1B, end portions of the magnetic film of the lower magnetic pole 2 are etched so as to incline with respect to the substrate 1. The inclination angle of the end surfaces of the magnetic film relative to the substrate is set to about 20–45°.

Step 3:

There is formed the reproducing section 9 composed of the insulating layer 5 forming the reproducing gap, the MR film 6, the electrodes, the bias film, etc.

Step 4:

Next, a sputtered film of $Co_XTa_YZr_Z$ (X+Y+Z=100 at. %, X: 82–94 at. %, Y≧3 at. %, Z≧2 at. %) amorphous alloy is formed as the intermediate magnetic pole 3 in the same manner as for the lower magnetic pole 2.

Steps 5 and 6:

Subsequently, the insulating layer 10 forming the recording gap is formed, along with the coil 11 and the insulating layer 12 for the coil 11.

The insulating layer 12 may be formed through use of a resist. As described above, since in the present embodiment the portion of the upper magnetic pole 13 in the vicinity of the floating surface 14 is formed of the plurality of curved surfaces 15(a), 15(b), and 15(c), application of resist for forming the insulating layer 12 is performed in three separate steps.

Steps 6-1 and 6-2:

Specifically, a first layer of resist is applied and hardened through application of heat in order to form the curved surface 15(*a*).

Steps 6-3 through 6-7:

Further, second and third layers of resist are applied and hardened through application of heat in order to form the curved surfaces 15(*b*) and 15(*c*).

Step 7:

Next, a film of Ni—Fe alloy whose Ni content falls within a range of 40–50 wt. % is formed as the upper magnetic pole 13.

Before the above-described plating process is carried out, a substrate film having a thickness of about 0.1 µm through which plating current flows is formed in advance in accordance with, for example, a sputtering method. For example, a film of 83 Ni-17 Fe (wt. %) alloy may be used as the substrate film. On the substrate film is formed a frame-shaped resist pattern that surrounds an area where the upper magnetic pole 13 is formed. Subsequently, a plating process is performed in order to form plated film inside and outside the frame. Unnecessary portions of the substrate film and the plated film are then removed through ion trimming and chemical etching. The upper magnetic pole 13 having a desired shape is obtained. Further, a protecting layer 16 is formed through use of $Al_2O_3$ in accordance with a magnetron sputtering method, and is then machined into a desired shape. Thus, the MR composite-type thin-film magnetic head of the present invention is completed.

Figure 4A:
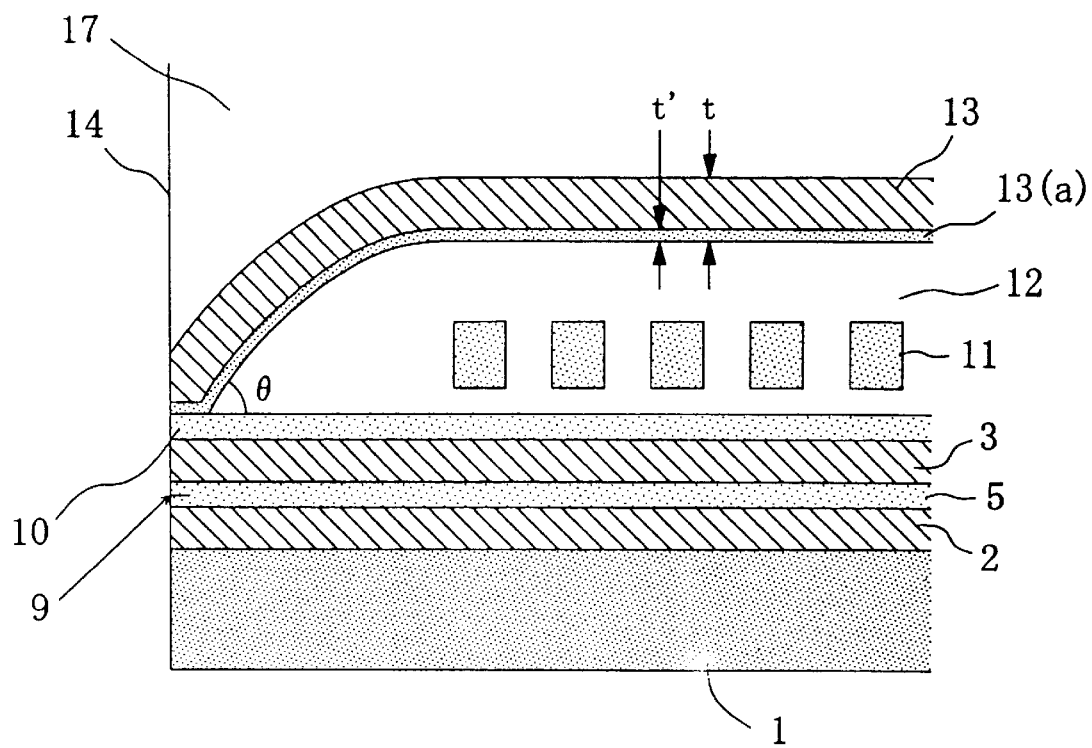
FIG. 4A is a cross-sectional view of an MR composite-type thin-film magnetic head according to a second embodiment of the present invention.

Second Embodiment:

In the second embodiment, as shown in FIG. 4A, the upper magnetic pole 13 is formed of two layered magnetic films, and the lower layer 13(*a*) closer to the gap is formed of a high-Bs plated film having a saturation magnetic flux density of 1.4 T or higher. The intermediate magnetic pole 3 is formed of a high-resistivity sputtered film. Specifically, a sputtered film of $Co_XTa_YZ_Z$ (X+Y+Z=100 at. %, X: 82–94 at. %, Y≧3 at. %, Z≧2 at. %) amorphous alloy is used as the high-resistivity sputtered film, while a plated film of Ni—Fe alloy which has a composition varying from that (center composition) of 45 Ni-55 Fe (wt. %) alloy and whose Ni content falls within a range of 40–50 wt. % is used as the high-Bs plated film. As in the intermediate magnetic pole 3, the lower magnetic pole 2 is formed of a high-resistivity sputtered film, specifically, a sputtered film of CoTaZr alloy.

The method for manufacturing the MR composite-type thin-film magnetic head of the second embodiment is identical with that for the first embodiment, except for the step for forming the upper magnetic pole 13. Therefore, a description will be given of a method for manufacturing the upper magnetic pole 13.

In order to form a substrate film through which plating current is caused to flow for formation of a plated film of the upper magnetic pole 13, there is formed a film of, for example, Ni—Fe alloy. The thickness of the plated film is set to 0.1 µm. On the substrate film is formed a frame-shaped resist pattern that surrounds an area where the upper magnetic pole 13 is formed. Subsequently, as the lower layer 13(*a*) of the upper magnetic pole 13, a film of Ni—Fe alloy whose Ni content falls with in a range of 40–50 wt. %, such as 45 Ni-55 Fe (wt. %) alloy, is formed through plating. The thickness t' of the plated film is set within the range of 0.3–1.5 µm; for example, to 0.5 µm. As a result, the saturation magnetic flux density Bs of the plated film becomes 1.4 T or higher. Further, A film of 83 Ni-17 Fe (wt. %) alloy-which has been used as the upper magnetic pole of a conventional MR composite-type thin-film magnetic head- is formed on the lower layer 13(*a*) of the upper magnetic pole 13 through plating. Through the above-described plating step, plated film is formed inside and outside the frame. Unnecessary portions of the substrate film and the plated film are then removed through ion trimming and chemical etching. The upper magnetic pole 13 having a desired shape is obtained.

EXAMPLES

Next will be described examples in which the MR composite-type thin-film magnetic heads according to the embodiments of the present invention was actually manufactured.

Example 1

The substrate 1 shown in FIGS. 1A and 1B was first formed through use of $Al_2O_3$—TiC. Subsequently, a sputtered film of $Co_{83}Ta_{12.2}Zr_{4.8}$ (at. %) amorphous alloy was formed as the upper magnetic pole 2 through use of a magnetron sputtering apparatus. The thus-formed film had a saturation magnetic flux density Bs of 0.9 T and a resistivity of 145 µΩ·cm. Subsequently, portions of the upper magnetic pole 2 to be left were protected through application of resist, and then unnecessary portions were removed through chemical etching.

For the chemical etching, there was used a mixture of nitric acid, cobalt sulfate, and hydrofluoric acid. Through such chemical etching, as shown in FIG. 1B, end portions of the magnetic film of the lower magnetic pole 2 were etched so as to incline with respect to the substrate 1. The inclination angle of the end surfaces of the magnetic film relative to the substrate 1 was set to about 20–45°. Subsequently, there was formed the reproducing section 9 composed of the insulating layer 5 forming the reproducing gap, the MR film 6, the electrodes, the bias film, etc. Next, a sputtered film of CoTaZr amorphous alloy was formed as the intermediate magnetic pole 3 in the same manner as for the lower magnetic pole 2. The composition of the CoTaZr amorphous alloy was such that the Co content was 88 at. %, the Ta content was 8 at. %, and the Zr content was 4 at. %. The thus-formed film had a saturation magnetic flux density Bs of 1.3 T and a resistivity of 120 µΩ·cm. Subsequently, the insulating layer 10 forming the recording gap, the coil 11, and the insulating layer 12 for the coil 11 were formed. The insulating layer 12 was formed through use of a resist. In the present example, application of resist for forming the insulating layer 12 was performed in three separate steps such that the portion of the upper magnetic pole 13 in the vicinity of the floating surface 14 was formed of the plurality of curved surfaces 15(*a*), 15(*b*), and 15(*c*). Specifically, a first layer of resist was applied and hardened through application of heat in order to form the curved surface 15(*a*). Further, second and third layers of resist were applied and hardened through application of heat in order to form the curved surfaces 15(*b*) and 15(*c*). Subsequently, a film of 45 Ni-55 Fe (wt. %) alloy was formed as the upper magnetic pole 13 through plating.

The thus-formed film had a saturation magnetic flux density Bs of 1.65 T and a resistivity of 55 µΩ·cm. Before the above-described plating process was carried out, a substrate film having a thickness of about 0.1 µm through which plating current flows was formed in accordance with a sputtering method. A film of 83 Ni-17 Fe (wt. %) alloy was used as the substrate film. On the substrate film was formed a frame-shaped resist pattern that surrounded an area where the upper magnetic pole 13 was to be formed. Subsequently, a plating process was performed in order to form plated film inside and outside the frame. Unnecessary portions of the substrate film and the plated film were then removed through ion trimming and chemical etching. The upper magnetic pole 13 having a desired shape was obtained. Further, a protecting layer 17 was formed through use of $Al_2O_3$ in accordance with a magnetron sputtering method, and was then machined into a desired shape. Thus, the MR composite-type thin-film magnetic head of the present embodiment was completed.

As shown in FIG. 1A, the shape of the upper magnetic pole in the vicinity of the floating surface was formed by a plurality of curved surfaces. The interior angle θ1 between the gap surface and a tangential line of a curved surface of the upper magnetic pole closest to the floating surface was set to 30°, and the angles interior $θ_2$, and $θ_2'$ between the gap surface and tangential lines of curved surfaces of the upper magnetic pole were set to 60°. The thickness of the upper magnetic pole was 3.5 μm, and the size of the recording gap was 0.4 μm.

Example 2

There was manufactured a head of Example 2 whose structure is identical to that of the head of Example 1, except that the size of the recording gap was set to 0.3 μm.

Example 3

A head of Example 3 was manufactured in the same manner as for Example 1, except that, as shown in FIG. 4A, the upper magnetic pole 13 was formed of two layered magnetic films. Specifically, a film of 45 Ni-55 Fe (wt. %) alloy was formed through plating. Thus, a high-Bs plated film having a saturation magnetic flux density of 1.4 T or higher was formed as the lower layer 13(a) closer to the gap.

Before the formation of the upper magnetic pole 13, a film of 83 Ni-17 Fe (wt. %) alloy was formed as a substrate film, through which plating current was caused to flow for formation of a plated film. The thickness of the plated film was set to 0.1 μm. On the substrate film was formed a frame-shaped resist pattern that surrounded an area where the upper magnetic pole 13 was to be formed. Subsequently, as the lower layer 13(a) of the upper magnetic pole 13, a film of 45 Ni—Fe (wt. %) alloy was formed through plating. The thickness t' of the plated film was set to 0.5 μm. The thus-formed film had a saturation magnetic flux density Bs of 1.65 T and a resistivity of 55 μΩ·cm. Further, a film of 83 Ni-17 Fe (wt. %) alloy was formed through plating. The thickness of the thus-formed film was 3.5 μm. Through the above-described plating step, plated film was formed inside and outside the frame. Unnecessary portions of the substrate film and the plated film were then removed through ion trimming and chemical etching. The upper magnetic pole 13 having a desired shape was obtained.

Example 4

There was manufactured a head of Example 4 whose structure is identical to that of the head of Example 3, except that the size of the recording gap was decreased to 0.35 μm.

Example 5

There was manufactured a head of Example 5 whose structure is identical to that of the head of Example 3, except that the size of the recording gap was decreased to 0.3 μm.

Comparative Example 1

A head of Comparative Example 1 was manufactured in the same manner as for Example 1, except that both the upper and intermediate magnetic poles were formed of a plated film of 83 Ni-17 Fe (wt. %) alloy. In this embodiment, as shown in FIG. 4A, the shape of the upper magnetic pole in the vicinity of the floating surface was formed of a single curved surface. The thickness of the upper magnetic pole was 4.5 μm, and the size of the recording gap was 0.4 μm. The lower magnetic pole was a film of $Co_{83}Ta_{12.2}Zr_{4.8}$ (at. %) amorphous alloy. The thickness of the intermediate magnetic pole was 3 μm, and the thickness of the lower magnetic pole was 2 μm.

Comparative Example 2

A head of Comparative Example 2 was manufactured such that the intermediate magnetic pole was formed of a plated film of 83 Ni-17 Fe (wt. %) alloy, while the upper magnetic pole was formed of a plated film of 45 Ni-55 Fe (wt. %) alloy, and such that, as shown in FIG. 1A, the shape of the upper magnetic pole in the vicinity of the floating surface was formed of a plurality of curved surfaces. The angle θ1 between the gap surface and a tangential line of a curved surface of the upper magnetic pole closest to the floating surface was set to 30°, and the angles $θ_2$, and $θ_2'$ between the gap surface and tangential lines of the remaining curved surfaces of the upper magnetic pole were set to 60°. The thickness of the upper magnetic pole was 3.5 μm. Except the above, the structure of the head of Comparative Example 2 was identical to that of Comparative Example 1.

Comparative Example 3

A head of Comparative Example 3 was manufactured such that the intermediate magnetic pole was formed of a plated film of 83 Ni-17 Fe (wt. %) alloy; the lower layer of the upper magnetic pole was formed of a plated film of 45 Ni-55 Fe (wt. %) alloy; and the upper layer of the upper magnetic pole was formed of a plated film of 83 Ni-17 Fe (wt. %) alloy. The upper layer of the upper magnetic pole had a thickness of 4.0 μm, and the lower layer of the upper magnetic pole had a thickness of 0.5 μm. The size of the recording gap was 0.4 μm.

Table 1 shows the results of comparison in terms of recording characteristics between the MR composite-type thin-film magnetic heads of Examples 1–5 of the present invention and the MR composite-type thin-film magnetic heads of Comparative Examples 1–3.

For measurement of recording characteristics, a 3.5-inch magnetic disk was used, and measurement was performed at a rotational speed of 5400 rpm. The recording density was 175 kFCI at an intermediate track, and 160 kFCI at an outer track. The magnetic disk had a coercive force of 190 kA/m, and the floating amount was set to about 45 nm. O/W was measured as follows. First, a reproducing output obtained from a signal recorded at a low frequency LF was measured. Subsequently, a signal was recorded at a high frequency HF, and a reproducing output obtained from the signal recorded at the high frequency HF and a residual output of the signal recorded at the low frequency LF were measured. The ratio of the residual output to the output obtained from the signal recorded at the high frequency HF was calculated as O/W. NLTS was measured in accordance with a fifth-order harmonic extraction method. For the intermediate track, LF was 13 MHz, and HF was 65 MHz. For the outer track, LF was 16 MHz, and HF was 80 MHz. The recording current was 30 mA.

TABLE 1

| Head | Head structure | Intermediate track O/W (dB) | Intermediate track NLTS (%) | Outer track O/W (dB) | Outer track NLTS (%) |
|---|---|---|---|---|---|
| Comparative Example 1 | Upper pole: 83Ni—17Fe (wt %)<br>Intermediate pole: 83Ni—17Fe (wt %)<br>Shape of upper pole: Single curved surface<br>Thickness of pole: 4.5 μm<br>Recording gap: 0.4 μm | −28.5 | 36.0 | −27.2 | 40.0 |
| Comparative Example 2 | Upper pole: 45Ni—55Fe (wt %)<br>Intermediate pole: 83Ni—17Fe (wt %)<br>Shape of upper pole: Plural curved surfaces<br>Thickness of pole: 3.5 μm<br>Recording gap length: 0.4 μm | −37.7 | 42.3 | −32.0 | 46.2 |
| Example 1 | Upper pole: 45Ni—55Fe (wt %)<br>Intermediate pole: Co88Ta8Zr4 (at %)<br>Shape of upper pole: Plural curved surfaces<br>Thickness of pole: 3.5 μm<br>Recording gap: 0.4 μm | −40.5 | 28.2 | −40.3 | 26.5 |
| Example 2 | Upper pole: 4.5Ni–55Fe (wt %)<br>Intermediate pole: Co88Ta8Zr4 (at %)<br>Shape of upper pole: Plural curved surfaces<br>Thickness of pole: 3.5 μm<br>Recording gap: 0.3 μm | −39.8 | 26.3 | −40.2 | 20.0 |
| Comparative Example 3 | Upper layer of upper pole: 83Ni—17Fe<br>Lower layer of upper pole: 45Ni—55Fe<br>Intermediate pole: 83Ni—17Fe<br>Thickness of upper layer of upper pole: 4.0 μm<br>Thickness of lower layer of upper pole: 0.5 μm<br>Recording gap: 0.4 μm | −35.0 | 35.3 | −33.5 | 40.0 |
| Example 3 | Upper layer of upper pole: 83Ni—17Fe<br>Lower layer of upper pole: 45Ni—55Fe<br>Intermediate pole: Co88Ta8Zr4<br>Thickness of upper layer of upper pole: 4.0 μm<br>Thickness of lower layer of upper pole: 0.5 μm<br>Recording gap: 0.4 μm | −39.3 | 34.8 | −37.1 | 32.5 |
| Example 4 | Upper layer of upper pole: 83Ni—17Fe<br>Lower layer of upper pole: 45Ni—55Fe<br>Intermediate pole: Co88Ta8Zr4<br>Thickness of upper layer of upper pole: 4.0 μm<br>Thickness of lower layer of upper pole: 0.5 μm<br>Recording gap: 0.35 μm | −37.9 | 29.7 | −36.6 | 28.0 |
| Example 5 | Upper layer of upper pole: 83Ni—17Fe<br>Lower layer of upper pole: 45Ni—55Fe<br>Intermediate pole: Co88Ta8Zr4<br>Thickness of upper layer of upper pole: 4.0 μm<br>Thickness of lower layer of upper pole: 0.5 μm<br>Recording gap: 0.30 μm | −36.2 | 27.5 | −36.4 | 23.1 |

As shown in Table 1, in the case of Comparative Example 1 in which both the upper and intermediate magnetic poles are formed of a plated film of 83 Ni-17 Fe (wt. %) alloy, O/W exceeds −30 dB at both inner and outer tracks. Further, NLTS becomes equal to or greater than 30%. The reason why the value of O/W is large is that the saturation magnetic flux density Bs of the plated film of 83 Ni-17 Fe alloy is as low as about 1 T, and therefore a recording magnetic field is insufficient, so that the signal recorded at LF remains unerased. The head of Comparative Example 2—in which a high-Bs plated film of 45 Ni-55 Fe is used for the upper magnetic pole and the portion of the upper magnetic pole in the vicinity of the floating surface is formed of a plurality of curved surfaces—has a greatly improved O/W characteristic such that the level of O/W is not greater than −30 dB. However, the head of Comparative Example 2 exhibits a deteriorated NLTS characteristic such that NLTS is equal to or greater than 40% at both intermediate and outer tracks. The reason for the deterioration in NLTS is considered that, since the magnetostriction of the 45 Ni-55 Fe plated film is large, the magnetic characteristics deteriorate due to internal stresses, so that the rising speed of the magnetic field in response to recording current decreases.

By contrast, the head of Example 1—in which a high-Bs plated film of 45 Ni-55 Fe is used for the upper magnetic pole and a high-resistive sputtered film of $Co_{88}Ta_{89}Zr_4$ (at. %) amorphous alloy is used for the intermediate magnetic pole—exhibits an excellent O/W characteristic such that the level of O/W is on the order of −40 dB. Further, the head of Example 1 exhibits a reduced level of NLTS equal to or less than 30%.

The reason why the NLTS characteristic has been greatly improved is not clear. In consideration of the fact that the NLTS characteristic has been improved to a greater degree at the outer track where the frequency is high, it is considered that the eddy current loss at high frequency decreases due to a high resistivity of the sputtered film of CoTaZr amorphous alloy, so that the speed of instantaneous rising of the recording magnetic field increases. The reason why the O/W characteristic has been greatly improved is conceivably that the saturation magnetic flux density of the plated film of 45 Ni-55 Fe (wt. %) alloy used for the upper magnetic pole of the head of Example 1 is 1.4 T, which is higher than that of the plated film of 83 Ni-17 Fe (wt. %) alloy used for the upper magnetic pole of a conventional head. The head of Example 2 in which the size of the recording gap has been reduced to 0.3 μm has a further improved NLTS characteristic, so that NLTS at the intermediate track is 26.3%, and NLTS at the outer track is 20%.

As shown in Table 1, in the head of comparative Example 3 in which the upper magnetic pole is formed of two layers, the lower layer of the upper magnetic pole is formed of 45 Ni-55 Fe having a large saturation magnetic flux density. Therefore, the head of Comparative Example 3 has an improved O/W characteristic, and an improved NLTS characteristic as compared with Comparative Example 2. However, at the outer track where the frequency is high, the level of NLTS is still large, and the value of O/W is close to −30 dB. These characteristics are not satisfactory.

In the head of Example 3, in which the upper magnetic pole is formed of two layers, the lower layer of the upper magnetic pole is formed of 45 Ni-55 Fe having a high saturation magnetic flux density, and the intermediate magnetic pole is formed of a sputtered film of CoTaZr, the O/W characteristic has been further improved, and the level of NLTS decreases, especially at an outer track. The reason for these improvements in characteristics is conceivably that the eddy current loss at high frequency decreases due to a high resistivity of the sputtered film of CoTaZr amorphous alloy, so that the speed of instantaneous rising of the recording magnetic field increases.

Figure 4B:
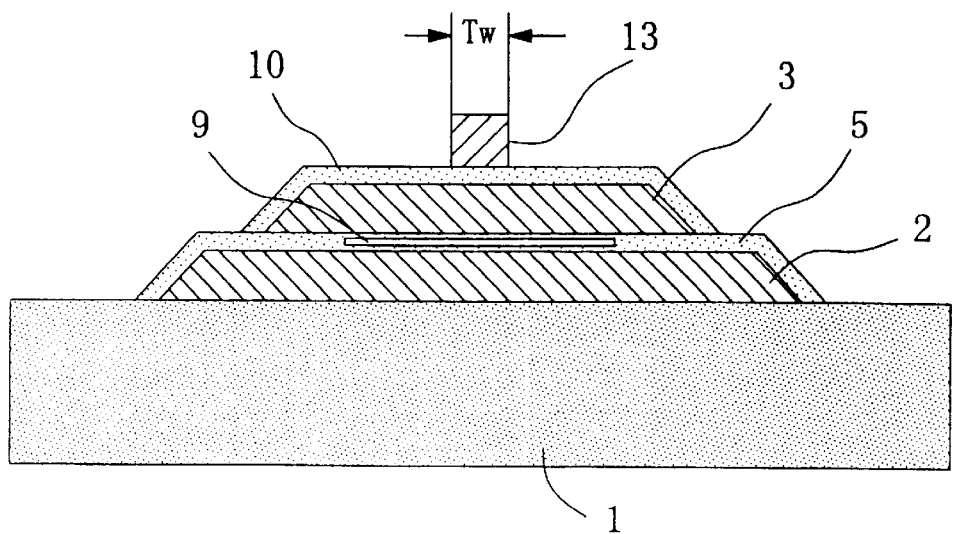
FIG. 4B is a cross-sectional view of the thin-film magnetic head of FIG. 4A, as viewed from the floating surface side.

In the thin-film magnetic head of the present invention, as shown in FIGS. 1B and 4B, the upper magnetic pole is formed to be greatly narrower than the lower and intermediate magnetic pole, and the width of the upper magnetic pole defines the recording track width Tw. The upper magnetic pole is formed of 45 Ni-55 Fe alloy having a high saturation magnetic flux density of 1.4 T, which is greater than that of 83 Ni-17 Fe alloy used in the comparative examples. Also, the sputtered film of CoTaZr constituting the intermediate magnetic pole has a high resistivity of 120 $\mu\Omega\cdot cm$. For the above-described reasons, the eddy current loss at high frequency has decreased.

In Examples 4 and 5 in which the size of the recording gap was reduced to 0.35 $\mu$m and 0.3 $\mu$m, respectively, although O/W increases slightly, NLTS decreases further, so that NLTS can be decreased to 30% or less, which is a required level.

Figure 5A:
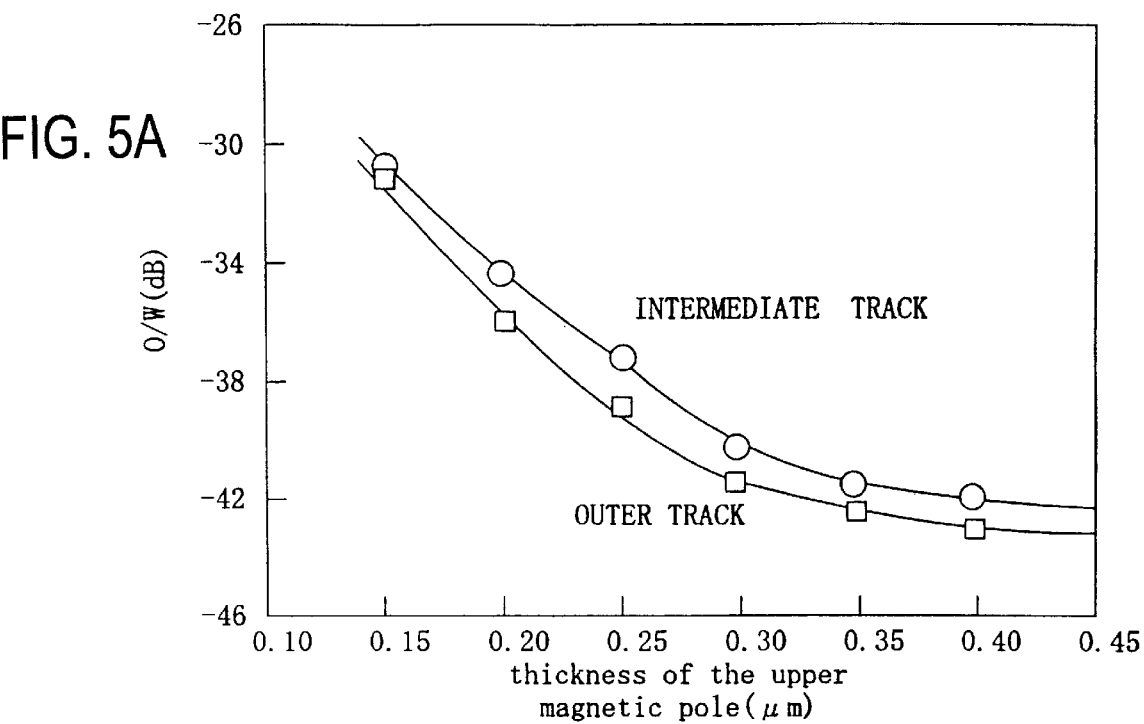
FIG. 5A is a graph showing the relationship between the size of the recording gap of the head of the present invention and the O/W characteristic.
Figure 5B:
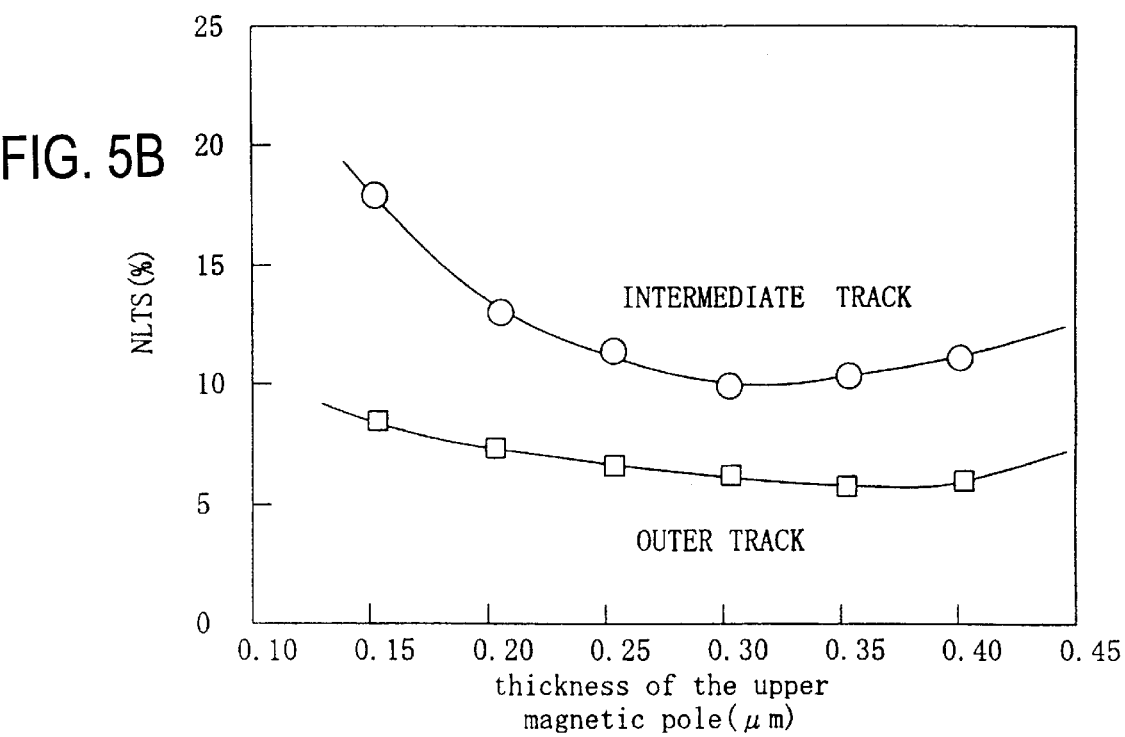
FIG. 5B is a graph showing the relationship between the size of the recording gap of the head of the present invention and the NLTS characteristic.

FIGS. 5A and 5B show the results of an experiment for measuring variations in NLTS and O/W with variation in the size of the recording gap in the head of Example 2. In the experiment, in order to improve NLTS characteristic, an R/W IC different from that shown in Table 1 was used. As shown in these graphs, when the size of the recording gap is further decreased from 0.3 $\mu$m, the O/W characteristic deteriorates, and the NLTS characteristic also deteriorates. When the size of the recording gap becomes less than 0.25 $\mu$m, the O/W characteristic deteriorates greatly. Therefore, the size of the recording gap must be set equal to or greater than 0.25 $\mu$m. Also, when the size of the recording gap exceeds 0.45 $\mu$m, the rising speed of recording magnetic field decreases, so that the NLTS characteristic deteriorates. Therefore, the size of the recording gap must be set equal to or less than 0.45 $\mu$m.

Figure 6A:
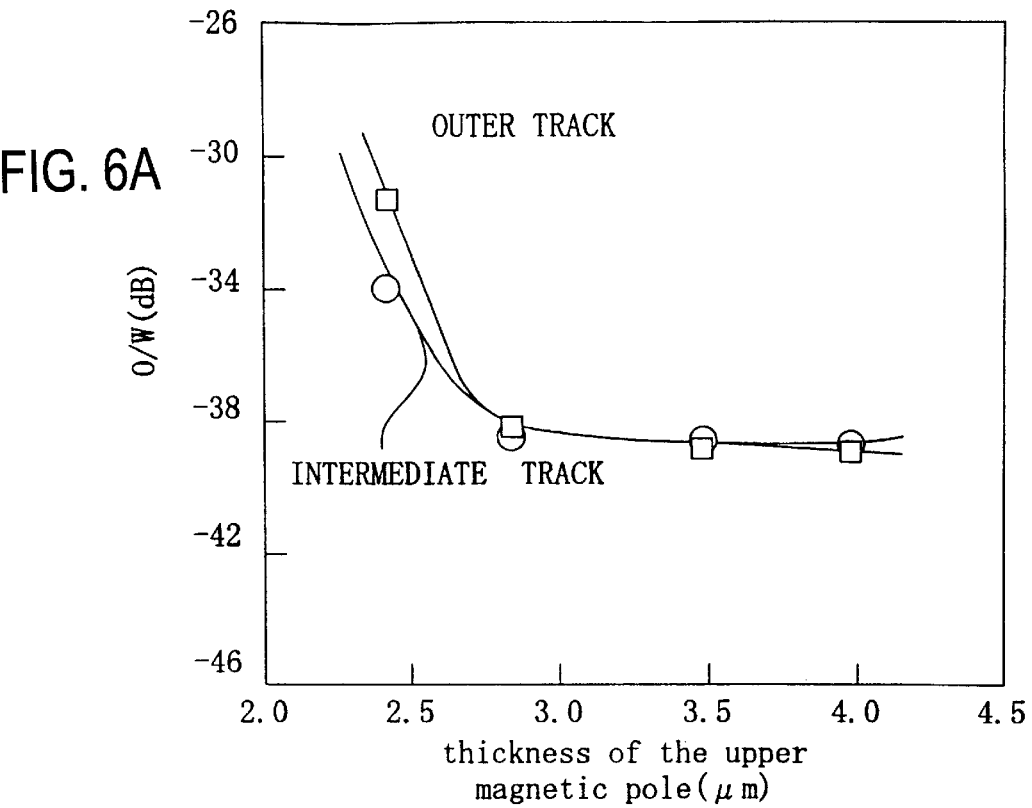
FIG. 6A is a graph showing the relationship between the thickness of the upper magnetic pole of the head of the present invention and the O/W characteristic.
Figure 6B:
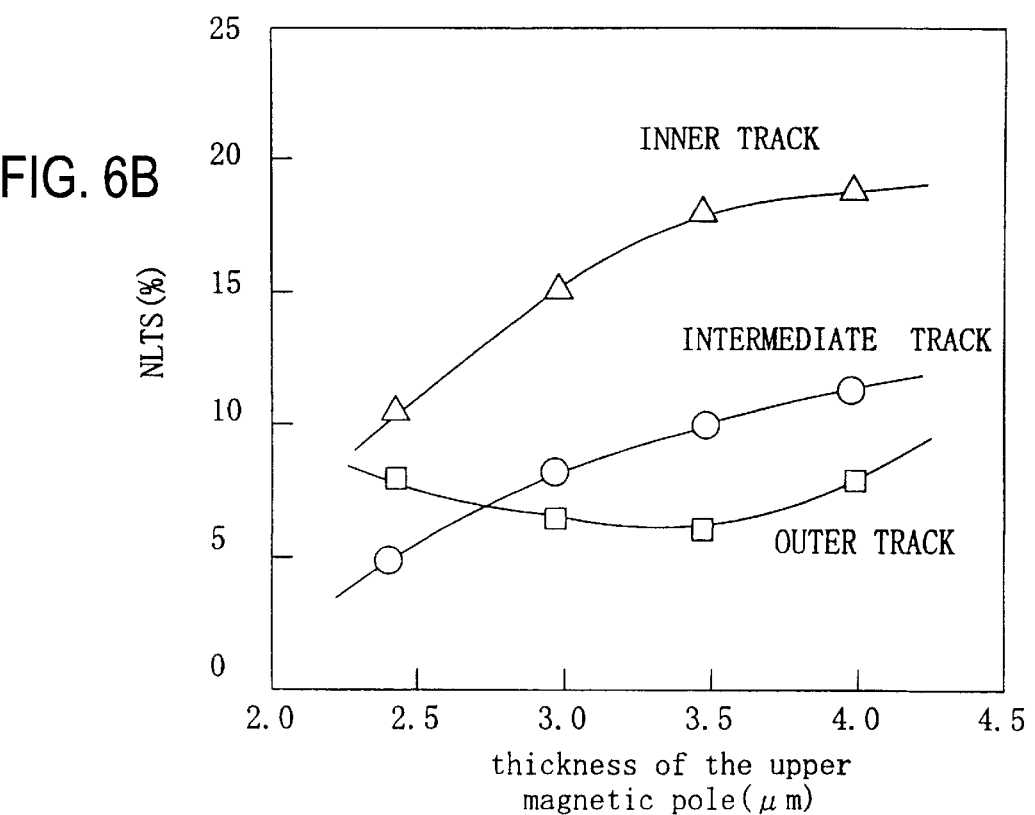
FIG. 6B is a graph showing the relationship between the thickness of the upper magnetic pole of the head of the present invention and the NLTS characteristic.
Figure 7:
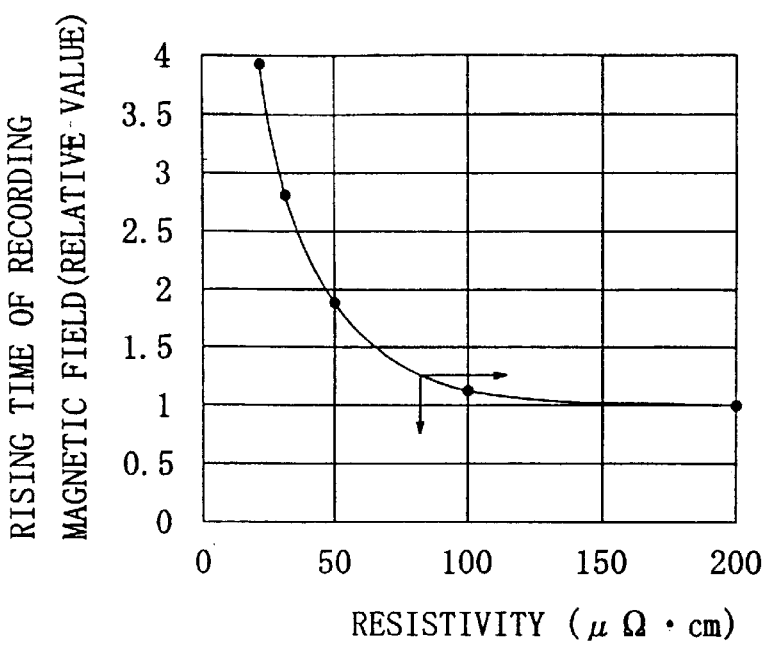
FIG. 7 is a graph showing the relationship between resistivity and rising speed of a recording magnetic field, which relationship is calculated through computer simulation.
Figure 8:
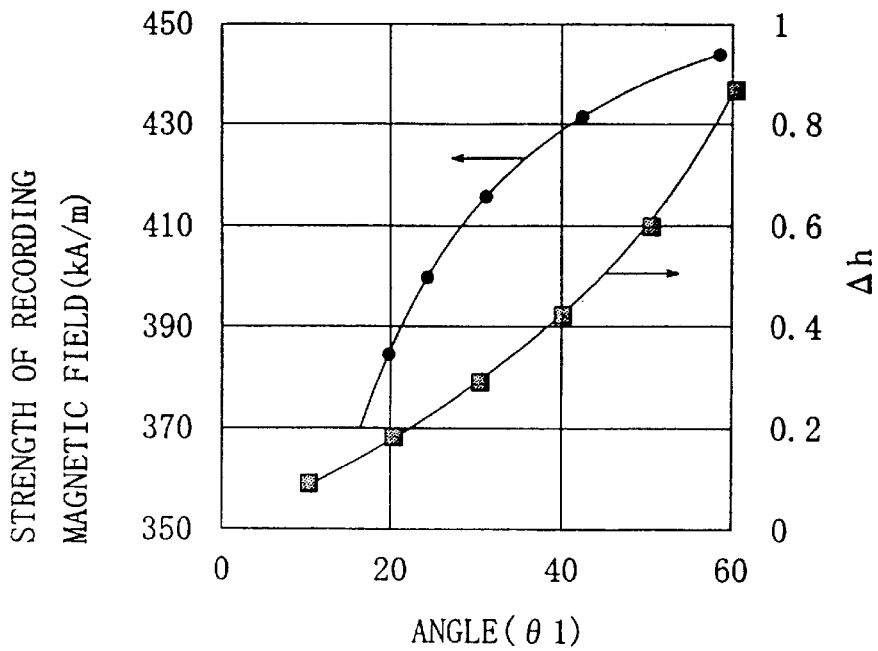
FIG. 8 is a graph showing the relationship of the angle $\theta_1$ versus the calculated value of the recording magnetic field strength and a variation $\Delta h$ of the film thickness of the upper magnetic pole at the floating surface caused by a variation of 0.5 μm in the throat height d.

FIGS. 6A and 6B show the results of an experiment for measuring variations in O/W and NLTS characteristics of the head of Example 2 when the thickness t of the upper magnetic pole in the vicinity of the center 18 of the upper magnetic pole is varied, while the size of the recording gap is maintained at 0.3 $\mu$m.

As shown in FIGS. 6A and 6B, the O/W characteristic does not change until the film thickness decreases to 3 $\mu$m and greatly deteriorates when the film thickness becomes less than 2.5 $\mu$m. The NLTS characteristic at the outer track improves as the film thickness decreases, and deteriorates when the film thickness exceeds 3.5 $\mu$m. Therefore, the thickness of the upper magnetic pole is preferably set to be not less than 2.5 $\mu$m but not greater than 3.5 $\mu$m.

Figure 10B:
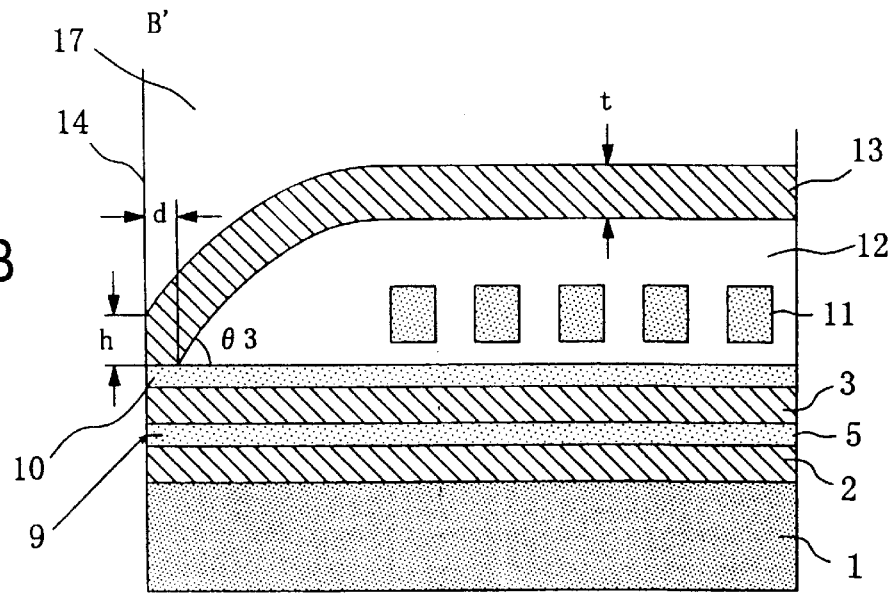
FIG. 10B is a cross-sectional view taken along line A–A' in FIG. 10A.
Figure 10C:
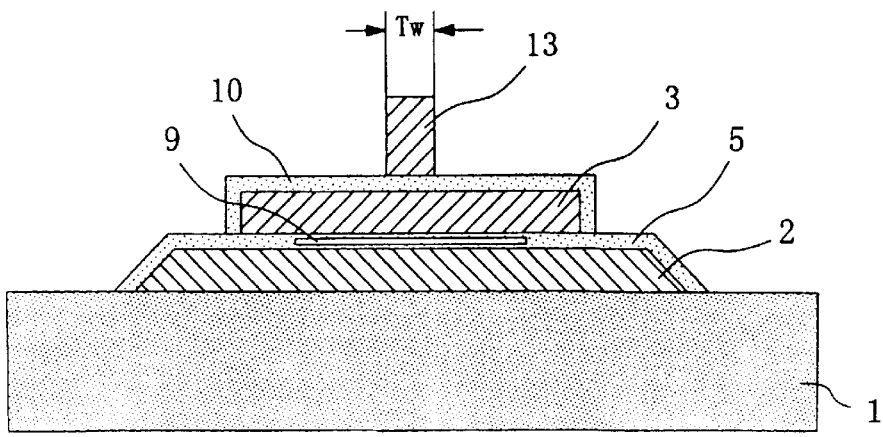
FIG. 10C is a cross-sectional view taken along line B–B' in FIG. 10A, as viewed from the floating surface side.

In the embodiments of the present invention, the portion of the upper magnetic pole 13 in the vicinity of the floating surface 14 is formed of a plurality of curved surfaces 15(a), 15(b), and 15(c), and an angle $\theta_1$ formed between the gap surface 15 and a floating-surface-side tangential line of the curved surface 15(a) closest to the floating surface 14 is made smaller than the angles $\theta_2$ and $\theta_2'$ between the gap surface 15 and floating-surface-side tangential lines of the curved surfaces 15(b) and 15(c), which are more distant from the floating surface 14. Therefore, the following advantageous effects can be achieved. That is, when the curved surface in the vicinity of the floating surface 14 is formed of a single curved surface as in the conventional MR composite-type thin-film magnetic head shown in FIG. 10B, the angle $\theta_3$ of the tangential line of the curved surface of the upper magnetic pole must be increased to 45° or greater in order to form the coil 11 near the floating surface 14. In this case, when the throat height d varies due to variations in machining accuracy, a variation in the film thickness h of the upper magnetic pole as viewed from the floating surface becomes considerably large. As a result, variations in recording characteristics such as O/W and NLTS characteristics increase, resulting in decreased yield. By contrast, as shown in FIG. 1A, when the portion of the upper magnetic pole 13 in the vicinity of the floating surface 14 is formed of a plurality of curved surfaces 15(a), 15(b), and 15(c), and the angle of the tangential line of the curved surface 15(a) closest to the floating surface 14 is made smaller, there can be decreased a variation in the film thickness h of the upper magnetic pole 13 as viewed from the floating surface, which variation is caused by a machining error of the throat height d. Further, since the angles $\theta_2$ and $\theta_2'$ of the floating-surface-side tangential lines of curved surfaces 15(b) and 15(c), which are more distant from the floating surface 14, are large, the entire coil 11 is prevented from being separated from the floating surface 14. When the distance between the coil 11 and the floating surface 14 is large, the speed of rising of a recording magnetic field in response to a recording current decreases, resulting in a decreased recording efficiency.

As shown in Table 1, FIGS. 1A and 1B, and FIGS. 4A and 4B,in the embodiments of the present invention, since a high-Bs plated film is used for the upper magnetic pole, the film thickness of the upper magnetic pole 13 can be decreased as compared with the case of a conventional head. Through reduction in the film thickness of the upper magnetic pole 13, the following advantage effect can be obtained. That is, when the film thickness of the upper magnetic pole 13 is large, the height h of the upper magnetic pole 13 as viewed from the floating surface 14 increases. In this case, defects are easily generated in an $Al_2O_3$ layer serving as a protective layer, and cracks are easily generated between the upper magnetic pole 13 and the recording gap due to a stress of the protective film or the like. When the film thickness h of the upper magnetic pole 13 is decreased, defects generated in the protective layer and cracks generated between the upper magnetic pole 13 and the recording gap can be greatly reduced.

What is claimed is:

1. A thin-film magnetic head comprising:
   a reproducing element disposed between a lower magnetic pole and an intermediate magnetic pole; and
   a recording induction coil disposed between the intermediate magnetic pole and an upper magnetic pole, wherein at least a portion of the upper magnetic pole in the vicinity of a recording gap is formed of a material having a high saturation magnetic flux density of 1.4 T or higher, and the intermediate magnetic pole is formed of a material having a high resistivity of 80 $\mu\Omega \cdot$cm or higher.

2. A thin-film magnetic head according to claim 1, wherein a surface of the upper magnetic pole facing the intermediate magnetic pole is formed of two or more flat or curved surfaces in the vicinity of the floating surface which faces a recording medium; and an angle formed between a gap surface of the upper magnetic pole facing a gap between the upper and intermediate magnetic poles and a floating-surface-side tangential line of a flat or curved surface closest to the floating surface is made smaller than the corresponding angle of the remaining flat or curved surface.

3. A thin-film magnetic head according to claim 2, wherein the angle formed between the gap surface and the floating-surface-side tangential line of the flat or curved surface closest to the floating surface is not less than 20° but not greater than 40°.

4. A thin-film magnetic head according to claim 2, wherein the angle formed between the gap surface and the floating-surface-side tangential line of the remaining flat or curved surface other than the flat or curved surface closest to the floating surface is 50–80°.

5. A thin-film magnetic head according to claim 1, wherein the upper magnetic pole is formed of two or more layered magnetic films; and the saturation magnetic flux density of the magnetic layer closer to the gap surface is 1.4 T or higher.

6. A thin-film magnetic head according to claim 5, wherein the thickness of the upper magnetic pole in the vicinity of the gap surface is 0.3–1.5 $\mu$m.

7. A thin-film magnetic head according to claim 1, wherein the thickness of the upper magnetic pole at the center thereof is 2.5–5 $\mu$m.

8. A thin-film magnetic head according to claim 1, wherein the size of the recording gap is not less than 0.25 $\mu$m but not greater than 0.45 $\mu$m.

9. A thin-film magnetic head comprising:
   a reproducing element disposed between a lower magnetic pole and an intermediate magnetic pole; and
   a recording induction coil disposed between the intermediate magnetic pole and an upper magnetic pole,
   wherein at least a portion of the upper magnetic pole in the vicinity of a recording gap is formed of a plated film having a high saturation magnetic flux density of 1.4 T or higher, and the intermediate magnetic pole is formed of a sputtered film having a high resistivity of 80 $\mu\Omega \cdot$cm or higher.

10. A thin-film magnetic head according to claim 9, wherein the reproducing element is an MR element.

11. A thin-film magnetic head according to claim 10, wherein the widths of the lower and intermediate magnetic poles in the widthwise direction of a track is 5 times or more than a recording track width, and the width of the upper magnetic pole is substantially equal to the recording track width.

12. A thin-film magnetic head according to claim 9, wherein the high-resistivity sputtered film is formed of a Co amorphous alloy.

13. A thin-film magnetic head according to claim 12, wherein the high-resistivity sputtered film is formed of a CoTaZr amorphous alloy having a Co content of 82–94 at. %, a Ta content of 3 at. % or greater, and a Zr content of 2 at. % or greater.

14. A thin-film magnetic head according to claim 9, wherein the plated film having a high saturation magnetic flux density is formed of an Ni—Fe alloy having a Ni content of 40–50 wt. %.

15. A thin-film magnetic head comprising:
   an MR element serving as a reproducing element and disposed between a lower magnetic pole and an intermediate magnetic pole; and
   a recording induction coil disposed between the intermediate magnetic pole and an upper magnetic pole,
   wherein at least a portion of the upper magnetic pole in the vicinity of a recording gap is formed of a material having a high saturation magnetic flux density of 1.4 T or higher, and the intermediate magnetic pole is formed of a material having a high resistivity of 80 $\mu\Omega \cdot$cm or higher.

* * * * *

UNITED STATES PATENT AND TRADEMARK OFFICE
CERTIFICATE OF CORRECTION

PATENT NO.: 6,101,068
DATED : August 8, 2000
INVENTOR(S): Shigekazu Ohtomo, et al.

It is certified that error appears in the above-identified patent and that said Letters Patent is hereby corrected as shown below:

Title Page, [54] change
"MR COMPOSITE-TYPE THIN-FILM MAGNETIC HEAD HAVING AN UPPER POLE WITH A HIGH SATURATION MAGNETIC FLUX DENSITY AND AN INTERMEDIATE POLE WITH A HIGH RESISTIVITY" to

--MR COMPOSITE-TYPE THIN-FILM MAGNETIC HEAD--.

Column 1, lines 2-6, after "HEAD" delete "HAVING AN UPPER POLE WITH A HIGH SATURATION MAGNETIC FLUX DENSITY AND AN INTERMEDIATE POLE WITH A HIGH RESISTIVITY".

Column 15, Example 2, change "4.5" to --45 (2$^{nd}$ column)--.

Signed and Sealed this

Twenty-ninth Day of May, 2001

Attest:

NICHOLAS P. GODICI

Attesting Officer     Acting Director of the United States Patent and Trademark Office